United States Patent Office 2,711,946
Patented June 28, 1955

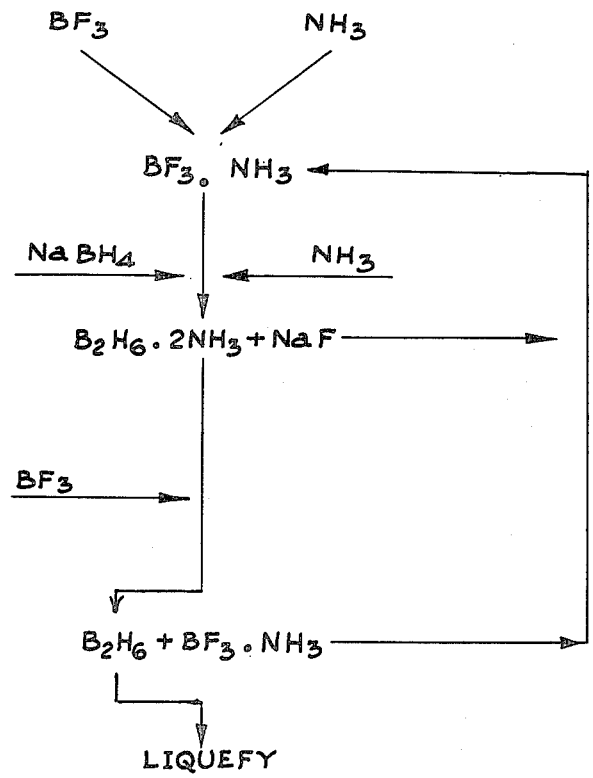
BALANCED REACTIONS:
$$BF_3 + NH_3 \longrightarrow BF_3 \cdot NH_3$$
$$BF_3 \cdot NH_3 + 3\,NaBH_4 + 3\,NH_3 \longrightarrow 2(B_2H_6 \cdot 2NH_3) + 3\,NaF$$
$$B_2H_6 \cdot 2NH_3 + 2\,BF_3 \longrightarrow B_2H_6 + 2\,BF_3 \cdot NH_3$$
*INVENTORS.*
WILLIAM H. SCHECHTER
SHELBY L. WALTERS.
BY
Brown, Critchlow, Flick & Peckham
their ATTORNEYS.

2,711,946

PRODUCTION OF DIBORANE

William H. Schechter, Zelienople, and Shelby L. Walters, Evans City, Pa., assignors, by direct and mesne assignments, to Callery Chemical Company, Pittsburgh, Pa., a corporation of Pennsylvania Application July 11, 1950, Serial No. 173,231

7 Claims. (Cl. 23—204)

This invention relates to a method of producing diborane.

Diborane ($B_2H_6$) may be made in various ways. A classical procedure involves the making first of magnesium boride which is then treated with acid to cause the evolution of a mixture of boron hydrides from which by appropriate fractionation there may be separated tetraborane ($B_4H_{10}$). This latter material breaks down under heat to form chiefly diborane. That procedure is involved and roundabout, the yields are low, complex mixtures result that are extremely difficult to separate to obtain the pure compound, and it is time consuming and requires elaborate apparatus and unusually skilful technique. Another procedure is to subject a mixture of hydrogen ($H_2$) and boron trichloride ($BCl_3$) to a high voltage discharge to form $B_2H_5Cl$ which decomposes to a mixture of diborane and boron trichloride. This method is subject to substantially the disadvantages just mentioned.

Still another mode of preparing diborane is to treat an alkali metal hydride, such as lithium hydride (LiH) with boron trifluoride ($BF_3$). This method is simpler than those just described, is more direct, and is productive of the desired material in substantially pure form. It would therefore be a more advantageous procedure were it not for the fact that it has been quite undependable. That is, although the reaction will occasionally start and run smoothly, in the great majority of cases it does not start for a substantial period of time, when it surges either violently enough to destroy the reaction vessel and associated apparatus or to cause contamination of the product.

The primary object of the present invention is to provide a method of making diborane from readily available and relatively inexpensive materials and which is simple, reliable, efficient, easily practiced with readily available apparatus, and is free from the disadvantages of the foregoing methods.

Other objects will appear from the following specification.

The accompanying drawing is a flow sheet representative of the present method and showing the balanced reactions upon which its preferred embodiment is based.

We have discovered, and it is upon this that the present invention is predicated, that diborane is produced smoothly and efficiently, and in conformity with the object of the invention, by contacting diborane diammoniate ($B_2H_6.2NH_3$) with boron trifluoride ($BF_3$) in a closed container. The diborane is evolved promptly and is recovered in any appropriate manner, as by liquefying it, which may be accomplished, for example, by passing the evolved gas to a condenser operated under atmospheric pressure such as a suitable collecting device that is surrounded by an appropriate refrigerating medium, e. g. liquid nitrogen ($N_2$). Or, if preferred, liquefaction may be produced at higher temperatures by operating the condenser under pressure, e. g., at 15 pounds gauge the diborane may be condensed by the use of solid carbon dioxide ($CO_2$) or a mixture of it with acetone ($ME_2CO$).

Thus we produce diborane in accordance with the following reaction:

I.   $B_2H_6.2NH_3 + 2BF_3 \rightarrow B_2H_6 + 2(BF_3.NH_3)$

Boron trifluoride may be supplied as such but, as is known, difficulties attend its use. Therefore, for most purposes we prefer to supply the boron trifluoride in the form of one of its organic complexes, or addition products. These are more easily handled and are usable for the same purpose as the fluoride itself. We have found that boron trifluoride etherate ($BF_3.Et_2O$) gives particularly satisfactory results. The term boron trifluoride reagent is used herein for brevity to include both boron trifluoride and its organic complexes of which a considerable number are known and available.

In the case where an organic complex of $BF_3$ is used the reaction may be exemplified by its complex with ethyl ether ($Et_2O$):

I$a$.  $B_2H_6.2NH_3 + 2(BF_3.Et_2O) \rightarrow$
$$B_2H_6 + 2(BF_3.NH_3) + 2Et_2O$$

Diborane diammoniate is a solid material at normal temperatures. In the practice of the invention it may be placed in a suitable container and boron trifluoride introduced into it while agitating the diammoniate. Or, the liquid organic complexes, which are liquids, may be introduced while agitating the reaction mixture. The reaction proceeds promptly and smoothly at normal room temperature although the reaction may be accelerated at higher temperatures. Again, the diborane diammoniate may be dissolved in an inert solvent following which the organic complex is added to the solution or boron trifluoride itself is bubbled into it. Or, the reverse procedures may be used, i. e., the diammoniate is added to the boron trifluoride complex as such or in an inert solvent.

The diborane diammoniate is preferably produced in accordance with the method described and claimed in a copending application filed by us July 11, 1950, Serial No. 173,232. In accordance therewith boron trifluoride reagent, as that term is used herein, is treated with ammonia ($NH_3$) to form the ammonia addition product of boron trifluoride ($BF_3.NH_3$). If the boron trifluoride is supplied as the etherate, or other organic complex, the resultant ether is vaporized to provide the solid $BF_3.NH_3$. In accordance with the invention of our copending application that compound is then dissolved, together with sodium borohydride ($NaBH_4$) in liquid ammonia whereupon diborane diammoniate is produced, together with sodium fluoride (NaF). The diammoniate is soluble in liquid ammonia while sodium fluoride is insoluble. The solution is therefore separated from the insoluble fluoride and upon vaporization of ammonia from it solid diborane diammoniate is recovered and may then be used in accordance with the present invention for the production of its diborane content. The reactions are as follows:

II   $BF_3.Et_2O + NH_3 \longrightarrow BF_3.NH_3 + Et_2O$

III
$$BF_3.NH_3 + 3NaBH_4 + 3NH_3 \xrightarrow{NH_3 \text{ liq}} 2(B_2H_6.2NH_3) + 3NaF$$

As will be observed from Equation I, the reaction involved in the present method yields the addition compound of boron trifluoride and ammonia which may, if desired, be recycled (after separation from organic compound if Equation I$a$ is followed) for reaction with sodium borohydride in accordance with Equation III to produce further amounts of diborane diammoniate for use in the practice of the present invention.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of making diborane which comprises contacting in a closed system diborane diammoniate with boron trifluoride reagent selected from the group consisting of boron trifluoride and its organic complexes and thereby causing evolution of gaseous diborane, and withdrawing and recovering the diborane so evolved.

2. A method according to claim 1, said reagent being boron trifluoride etherate.

3. A method according to claim 1, said diborane being recovered by liquefaction.

4. That method of making diborane which comprises reacting addition product of boron trifluoride and ammonia ($BF_3.NH_3$) with sodium borohydride in liquid ammonia to form a solution of diborane diammoniate and solid sodium fluoride, separating the solution from sodium fluoride and evaporating ammonia from it to produce solid diammoniate, then contacting in a closed system the solid diammoniate with boron trifluoride reagent selected from the group consisting of boron trifluoride and its organic complexes and thereby causing evolution of gaseous diborane, and withdrawing and recovering the diborane so evolved.

5. A method according to claim 4 in which the ammonia addition compound of boron trifluoride resulting from the diborane reaction is recycled for reaction with sodium borohydride to produce further diborane diammoniate.

6. That method of making diborane which comprises contacting in a closed system substantially stoichiometric proportions of solid diborane diammoniate and boron trifluoride reagent selected from the group consisting of boron trifluoride and its organic complexes and thereby causing evolution of gaseous diborane, and withdrawing and recovering the diborane so evolved.

7. That method of making diborane which comprises reacting addition product of boron trifluoride and ammonia ($BF_3.NH_3$) and sodium borohydride in proportions of, substantially, three mols of the latter to one mol of the former, in liquid ammonia in an amount to dissolve them and supply at least three mols of $NH_3$ per mol of said addition product and thereby forming a solution of diborane diammoniate and solid sodium fluoride, separating the solution from sodium fluoride and evaporating ammonia from it to recover solid diammoniate, then contacting in a closed system the solid diammoniate with boron trifluoride reagent selected from the group consisting of boron trifluoride and its organic complexes and thereby causing evolution of gaseous diborane, and withdrawing and recovering the diborane so evolved.

References Cited in the file of this patent

UNITED STATES PATENTS

| | | |
|---|---|---|
| 2,461,661 | Schlesinger et al. | Feb. 15, 1949 |
| 2,533,696 | Schaeffer et al. | Dec. 12, 1950 |

OTHER REFERENCES

Bell, article in "Quart. Rev.," pages 132–151, vol 2, 1948, London, England.